(12) United States Patent
Mizugaki et al.

(10) Patent No.: US 6,750,812 B2
(45) Date of Patent: Jun. 15, 2004

(54) TERMINAL AND SERVER FOR MOBILE TERMINAL POSITIONING SYSTEM

(75) Inventors: Kenichi Mizugaki, Kokubunji (JP); Atsushi Ogino, Kodaira (JP); Hideya Suzuki, Ichikawa (JP)

(73) Assignee: Hitachti, Ltd., Tokyo (JP)

( * ) Notice: Subject to any disclaimer, the term of this patent is extended or adjusted under 35 U.S.C. 154(b) by 128 days.

(21) Appl. No.: 10/079,584

(22) Filed: Feb. 22, 2002

(65) Prior Publication Data

US 2003/0128163 A1 Jul. 10, 2003

(30) Foreign Application Priority Data

Jan. 10, 2002 (JP) ........................................ 2002-002930

(51) Int. Cl.[7] ................................................ G01S 5/14
(52) U.S. Cl. ................................ 342/357.02; 455/456.2
(58) Field of Search .................. 342/357.02; 455/456.2, 455/456.6

(56) References Cited

U.S. PATENT DOCUMENTS

| | | | | | |
|---|---|---|---|---|---|
| 5,420,594 | A | * | 5/1995 | FitzGerald et al. | 342/357.14 |
| 6,002,936 | A | * | 12/1999 | Roel-Ng et al. | 455/456.4 |
| 6,430,504 | B1 | * | 8/2002 | Gilbert et al. | 701/213 |
| 2001/0018349 | A1 | * | 8/2001 | Kinnunen et al. | 455/456 |
| 2002/0082774 | A1 | * | 6/2002 | Bloebaum | 701/213 |
| 2002/0154058 | A1 | * | 10/2002 | Pande et al. | 342/357.09 |
| 2002/0193121 | A1 | * | 12/2002 | Nowak et al. | 455/456 |

* cited by examiner

Primary Examiner—Gregory C. Issing
(74) Attorney, Agent, or Firm—Reed Smith LLP; Stanley P. Fisher, Esq.; Juan Carlos A. Marquez, Esq.

(57) ABSTRACT

A server which provides information related to a service instructs positioning accuracy to a mobile terminal in accordance with a content of a requested service. The mobile terminal changes a position detecting method in accordance with the set positioning accuracy.

27 Claims, 6 Drawing Sheets

| POSITIONING ACCURACY | NUMBER OF BASE STATIONS USED FOR MEASUREMENT | DURATION OF SIGNAL MEASUREMENT | NUMBER OF SAMPLES FOR AVERAGING | CRITERIA FOR COMPLETION OF POSITION CALCULATION |
|---|---|---|---|---|
| 0 | 1 | 1 | 1 | LOW |
| 1 | 3 | 1 | 1 | LOW |
| 2 | 10 | 5 | 1 | LOW |
| 3 | 10 | 5 | 3 | LOW |
| 4 | 10 | 5 | 3 | HIGH |

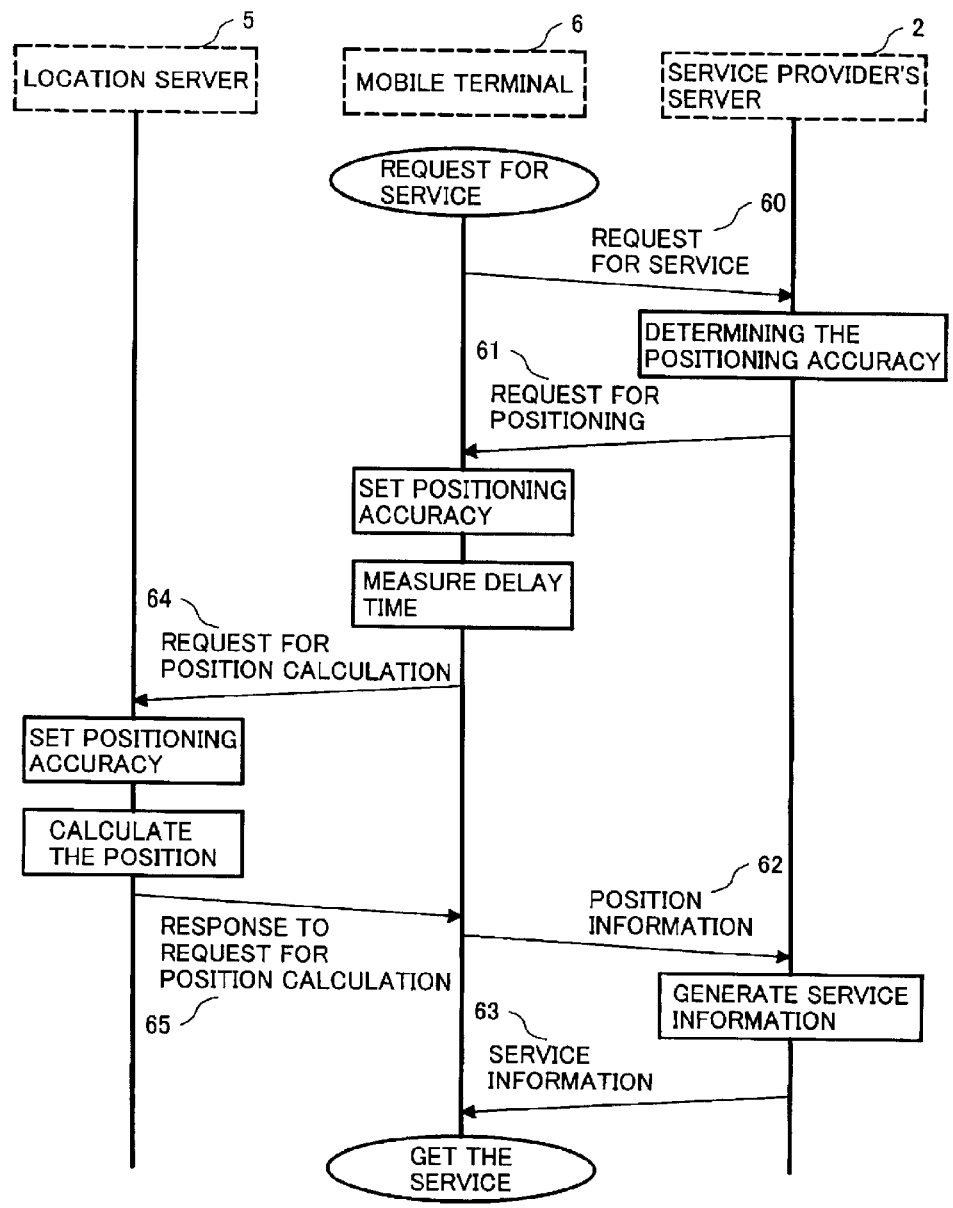

TERMINAL AND SERVER FOR MOBILE TERMINAL POSITIONING SYSTEM

BACKGROUND OF THE INVENTION

The present invention is related to a portable terminal having a position detecting function, a location calculating server apparatus having a position detecting function, and a service provider's server apparatus for providing information in response to a location of a portable terminal.

As one of information communication services with employment of mobile terminals, information may be provided in response to positions, or locations of these portable terminals. Specifically, information as to restaurants located in the vicinity of these mobile terminals may be provided, a time table of a station located at the nearest position with respect to a mobile terminal may be displayed, and a navigation service up to a destination place may be provided.

As such a position detecting method executed by way of a mobile terminal, JP-A-7-181242 (laid-open on Jul. 21, 1995) describes the position detecting apparatus with employment of the cellular wireless base station. In this position detecting apparatus, a mobile terminal firstly receives the signals which are transmitted from a plurality of wireless base stations. Then, the position detecting apparatus calculates a distance between the wireless base station and the mobile terminal based upon propagation delay of the signals so as to detect the position of the mobile terminal. A remarkable improvement is made in such position detecting techniques with employment of wireless base stations. The article "Positioning Cellular Phone without GPS" on page 1 of The Nikkei Business Daily issued on Mar. 16, 2000 describes that the error in the position detecting operation may be limited into a range of 10 meters.

Also, another method for detecting a position of a mobile terminal has been proposed, while a GPS receiver is built in this mobile terminal, and GPS electromagnetic waves transmitted from the GPS satellites are used. In this case, the mobile terminal firstly receives the GPS signals transmitted from a plurality of GPS satellites. This mobile terminal calculates both coordinate values of these satellites and propagation delay of the GPS signals based upon both orbit information and transmission time information of the satellites, which are contained in the received GPS signals. The position of this mobile terminal can be detected based on the above-calculated coordinate values and propagation delay.

SUMMARY OF THE INVENTION

Conventional mobile terminals having the above-described position detecting functions have been designed in such a manner that these mobile terminals may continuously detect the positions, or the locations of the own mobile terminals in high accuracy. However, these conventional mobile terminals do not own such a function capable of intentionally adjusting, or controlling positioning accuracy. As a consequence, it is practically difficult to change position detecting methods in accordance with required accuracy, while an attention is paid to utility of positional information. As a result, a first problem may occur. That is, while a provision of information made based upon a present position of a mobile terminal is accepted, in such a case that a detection error contained in a position detection result may give a small adverse influence to the provided information, one conventional position detecting method cannot be changed into such a simple position detecting method having a light load. For instance, when information as to movie theaters located within a circular range of 10 km is required while a present position of a mobile terminal is positioned as a center, there is no large difference between a content of positional information provided in the case that a position detecting operation is performed in such accuracy that a detection error is set to 50 meters, and a content of positional information provided in the case that a position detecting operation is carried out in such accuracy that a detection error is set to 100 meters. Under such a circumstance, if a position detecting method can be changed within such a range where there is no adverse influence in the provided positional information, then loads given to mobile terminals can be reduced and also power consumption thereof can be reduced, which may improve utility of users who use mobile terminals.

Also, as a second problem, the following difficulty may exist. That is, since such a conventional position detecting method can be made simpler, if necessary, a time duration required to detect a present position of a mobile terminal cannot be shortened, but also waiting time for a user of this mobile terminal cannot be reduced.

Furthermore, since time required to detect present positions is always constant in conventional mobile terminals, time periods during which position detecting operations are carried out are identical to each other irrespective of moving speeds of users of these conventional mobile terminals. However, position detecting time periods suitable for detecting present positions of these conventional mobile terminals will differ to each other, depending upon conditions of these mobile terminals. For example, in the case that an owner of a mobile terminal takes a train to be transported in a high speed, a positional change per one measuring time may become large, as compared with a positional change per one measuring time in such a case that this terminal owner is moved at the normal speed. As a result, a real-time characteristic of displaying of present positions of this mobile terminal may be improved if the time period for detecting the present positions of the mobile terminal is shortened so as to frequently detect these present position of this mobile terminal. Under such a circumstance, as a third problem, the following difficulty may exist. That is, for example, in such a case that an owner of a conventional mobile terminal is moved in a high speed, the real-time characteristic of the information as to the present positions of the conventional mobile terminals cannot be improved by changing the position detecting time duration in correspondence with this moving speed. With respect to such a mobile terminal which is moved in a high speed, if present positions of this mobile terminal are displayed by employing such a map whose range is made wider than the normal-ranged map, then the present positions of this mobile terminal can be readily grasped while reducing a total switching number of the normal-ranged maps. In this wide-ranged map case, even when positioning accuracy is not so high, these is a small adverse influence given to the results displayed on this wide-ranged map. As apparent from the foregoing descriptions, if the time duration for detecting the present position may be shortened and furthermore accuracy of the position detecting operation may be suppressed lower than the normal accuracy, then the real-time characteristic of the positional information of the mobile terminal could be improved without increasing the work load given to this mobile terminal.

In accordance with an aspect of the present invention, a means for solving both the first problem and the second problem may be realized by such a server apparatus which is equipped with both a function capable of changing a position detecting method in response to positioning accuracy which is instructed, and also, another function capable of instructing positioning accuracy with respect to a mobile terminal.

In accordance with another aspect of the present invention, a means for solving the third aspect of the present invention may be realized by both a mobile terminal which is equipped with a function capable of setting positioning accuracy and also a function capable of either setting or automatically recognizing a present move speed of the mobile terminal, and may be realized by such a server apparatus which is equipped with a function capable of instructing both a position detecting time duration and positioning accuracy with respect to the mobile terminal.

A terminal, according to an embodiment of the present invention, is provided with a reception unit for receiving signals which are transmitted from a plurality of signal generating sources; and a positioning unit for performing a position detecting operation based upon propagation delay time of the received signals, in which the positioning unit executes a position detecting operation by way of a positioning method in accordance with the variably set accuracy. The accuracy of the position detecting operation is determined in connection with a service provided by employing the terminal.

A position detecting function of the above-described terminal may be realized by a semiconductor device mounted on the terminal. The semiconductor device is provided with a propagation delay measurement unit and a position calculation unit. In the semiconductor device, a position detecting operation is carried out, while a total number of generating sources for signals whose propagation delays are measured, a time duration used to measure the signals, a calculation method, and position calculation completion criteria are changed based upon designated accuracy of the position detecting operation.

A service provider's server apparatus, according to another embodiment of the present invention, is comprised of a table which describes a correspondence relationship between plural sorts of services and accuracy of position detecting operations, and the service provider's server apparatus instructs a terminal to perform the position detecting operation in accuracy corresponding to a requested service. Then, this service provider's server apparatus provides a service based upon a received detection result. Alternatively, the service provider's server apparatus may instruct the accuracy of the position detecting operation to the terminal, while employing a total number of signal generating sources, a measurement time duration of signals, a total sampling number used for averaging operation, position calculation completion criteria, and so on.

The technical scope/spirit of the present invention may cover such a method of providing a service by utilizing a terminal position. That is to say, while a position detecting operation executed in accuracy in accordance with a sort of service is instructed, the service is provided based upon the result of this position detecting operation.

Other objects, features and advantages of the invention will become apparent from the following description of the embodiments of the invention taken in conjunction with the accompanying drawings.

BRIEF DESCRIPTION OF THE DRAWINGS

For a better understanding of the present invention, reference is made of a detailed description is conjunction with the accompanying drawings, in which:

FIG. 8 is a diagram for schematically representing a process flow operation of messages until a service is provided in the case that the position calculating server of FIG. 7 is used.

DESCRIPTION OF THE EMBODIMENTS

Figure 1:
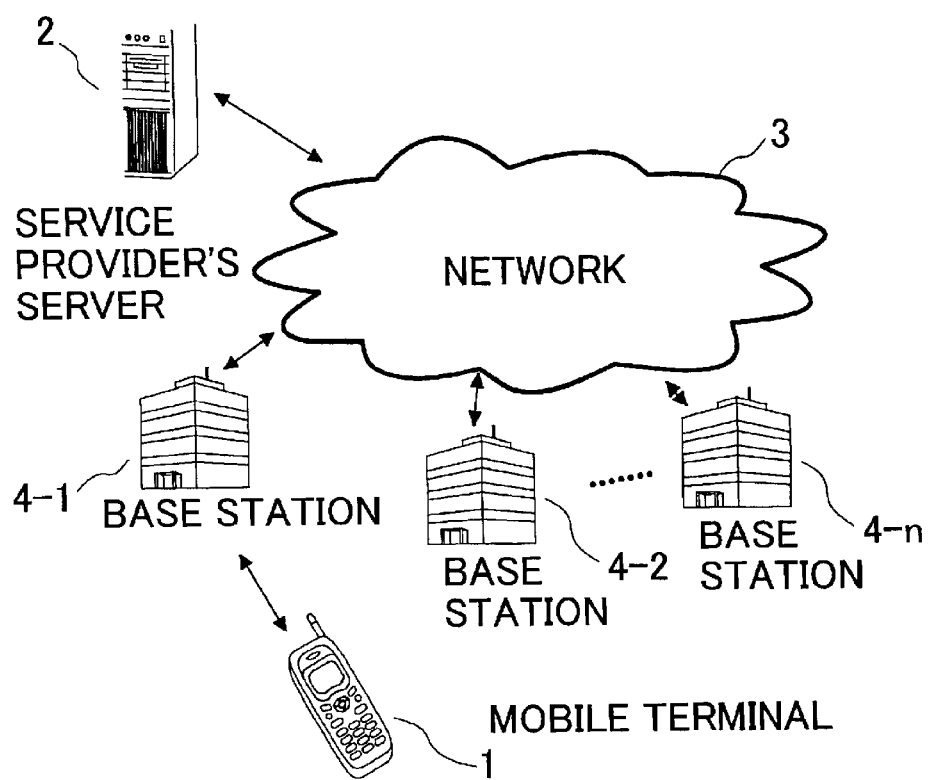
FIG. 1 is a schematic diagram for illustratively showing a position detecting system, according to one embodiment of the present invention, for detecting a position of a mobile terminal by employing signals transmitted from wireless base stations.

FIG. 1 illustratively shows an arrangement of a position detecting system as one embodiment mode of the present invention, while this position detecting system detects a position of a mobile terminal by employing signals transmitted from wireless base stations.

The position detecting system, according to this embodiment of the present invention, is constituted by a mobile terminal 1 having a position detecting function, and a plurality of wireless base stations "4-1" to "4-$n$", which are connected to a network 3. Also, a server 2 of a service provider is connected to this network 3. The mobile terminal 1 may detect a position of the own mobile terminal 1 based upon propagation delay (propagation delay time) of signals transmitted from the plural wireless base stations 4-1 to 4-$n$. The service provider's server 2 receives positional information of the mobile terminal 1, and provides such a service in correspondence with this received positional information.

Figure 2:
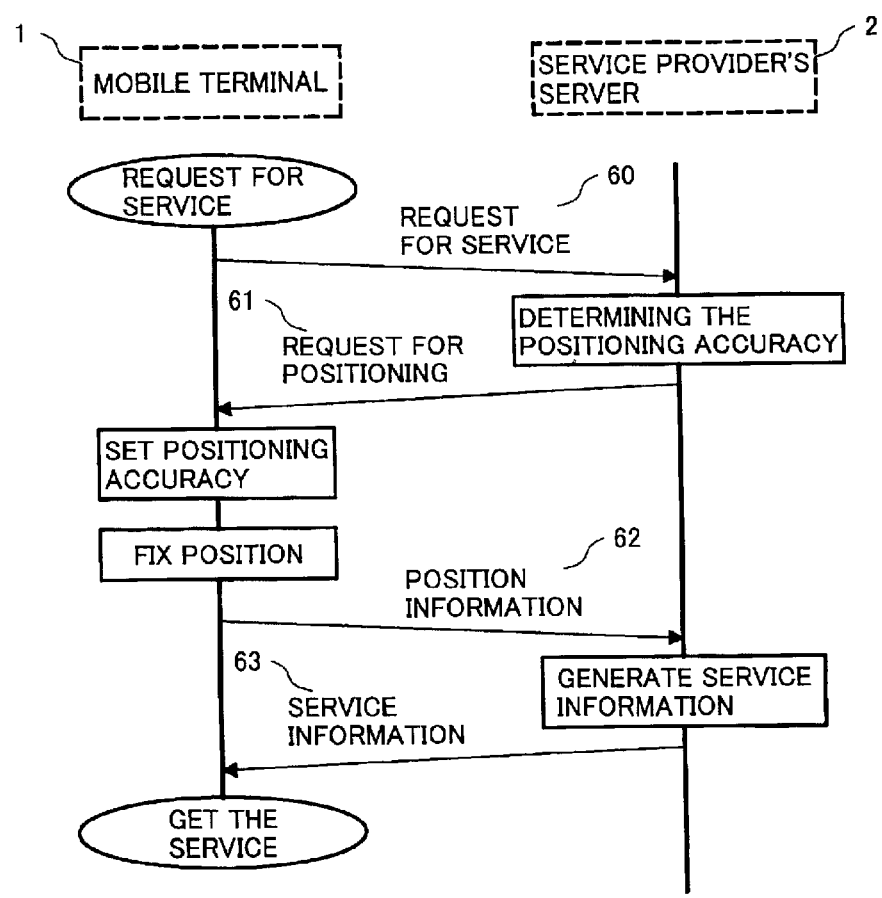
FIG. 2 is a diagram for schematically representing a process flow operation of messages until a service is provided in the position detecting system of FIG. 1.

FIG. 2 illustratively indicates an example of a process flow operation of messages until a service is provided in the position detecting system according to this embodiment of the present invention. In the present invention, the mobile terminal 1 sends a request 60 of receiving a service to the service provider's server 2. The service provider's server 2 sets positioning accuracy based upon a content of the requested service, and then, transmits a request 61 for positioning operation with respect to the mobile terminal 1. The mobile terminal 1 produces positional information 62 based upon a result of the positioning operation, and then, sends the produced positional information 62 to the service provider's server 2. The service provider's server 2 produces service information 63 based upon the received positional information 62, and then, transmits this produced service information 63 to the mobile terminal 1.

It should be noted that in this case, the service provider's server 2 may provide this service information 63 via the network 3 as such information required for another service.

Figure 3:
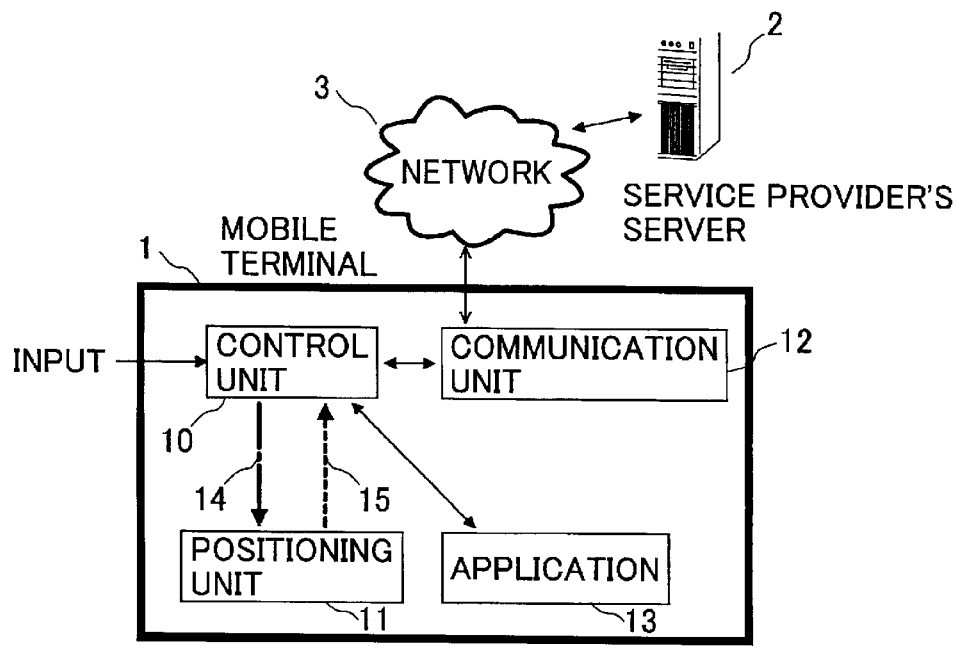
FIG. 3 is a schematic diagram for indicating an arrangement of a mobile terminal employed in the position detecting system of FIG. 1.

FIG. 3 schematically shows an example of an arrangement of the mobile terminal 1 employed in the above-described position detecting system, according to one embodiment of the present invention. The mobile terminal 1 is constituted by a positioning unit 11, a communication unit 12, and an application program, which are connected to a control unit 10. It should also be noted that while the mobile terminal 1 is equipped with a display screen and various sorts of input buttons, since these structural elements are not directly related to the present invention, these structural elements are omitted.

In the mobile terminal 1, an externally-supplied input and a service-receiving request (namely, request for receiving service) issued from the application program 13 are recognized by the control unit 10. The control unit 10 sends the service-receiving request 60 via the communication unit 12 to the service provider's server 2 in response to the content of the service-receiving request. The mobile terminal 1 receives via the communication unit 12, a request 61 for executing a positioning operation which is sent as the response of this service-receiving request 60. Then, the mobile terminal 1 transmits this positioning-operation request 61 to the control unit 10. The control unit 10 sets positioning accuracy 14 with respect to the positioning unit 11 in response to the content of the received positioning-operation request 61. The positioning unit 11 changes the positioning method based upon the set positioning accuracy 14, and then, performs a positioning operation in accordance with the changed positioning method. Both the positioning accuracy 14 and the position detecting method corresponding thereto will be described later. After the position detecting operation has been accomplished, the control unit 10 receives a result 15 of this positioning operation, and then, sends the positional information 62 of the mobile terminal 1 via the communication unit 12 to the service provider's server 2. The mobile terminal 1 receives the service information 63 which is transmitted from the service provider's server 2, and provides a service to a user via either the display screen or the application program 13 built in this mobile terminal 1.

Also, the below-mentioned position detecting system may be covered by the technical scope/spirit of the present invention. That is, at a time instant when a portable terminal receives the above-described positioning-operation request 61, a check is made as to whether or not a necessity of such a positioning operation is present. In the case that this necessity is not recognized, while the positioning operation is not carried out, a specific coordinate value is provided as the positioning result 15 to a service provider's server. For example, in such a case that the portable terminal receives the positioning-operation request 61 within 30 seconds after the preceding positioning operation has been carried out, while the positioning operation is not again carried out, the positioning result obtained in this preceding positioning operation is transmitted to the service provider's server, so that both the reduction of the response time and lowering of the terminal load may be realized. It should also be noted that criteria used to judge as to whether or not the positioning operation is again performed may be employed at any time instants other than the above-explained time instant after the preceding positioning operation has been performed, and/or may be made different from each other, depending upon requested services.

Figure 4:
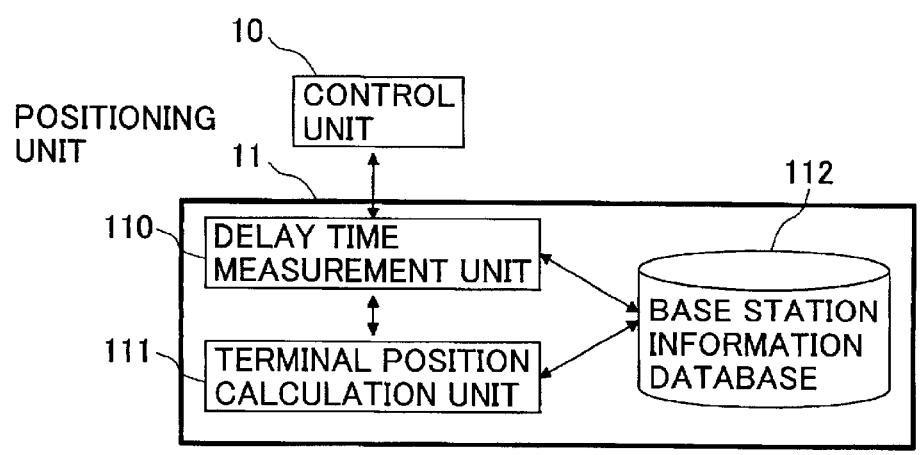
FIG. 4 is a schematic diagram for showing an arrangement of a positioning unit employed in the position detecting system of FIG. 1.

FIG. 4 schematically shows an example of an arrangement of the positioning unit 11. This positioning unit 11 is constituted by a propagation delay measurement unit 110, a terminal position calculation unit 111, and a base station information database 112. While this positioning unit 11 is employed, one example of a position detecting method for specifying a position, or a location of the mobile terminal 1 based on electromagnetic waves transmitted from wireless base stations will now be explained as follows:

That is, the mobile terminal 1 receives a signal transmitted from a wireless base station 4-1 which is located in the vicinity of this mobile terminal 1, and acquires an ID (identification) specific to this wireless base station 4-1 based upon this received signal. Next, while the mobile terminal 1 uses the acquired ID of the wireless base station 4-1 as a key, this mobile terminal 1 acquires base station information with respect to peripheral wireless base stations "4-1" through "4-$n$" based on the base station information database 112 built in the own mobile terminal 1. The base station contains transmission timing of signals and coordinate information of the relevant wireless base stations. The mobile terminal 1 measures reception timing of signals transmitted from a plurality of peripheral wireless base stations 4-1 to 4-$n$ based upon the above-described base station information by employing the propagation delay measurement unit 110. The mobile terminal 1 acquires propagation delay (propagation delay time) of the signals from the respective wireless base stations based upon differences between both this measurement result of the reception timing and the above-described transmission timing obtained from the base station information so as to calculate distances between this mobile terminal 1 and the respective wireless base stations 4-1 to 4-$n$. While the distances between this mobile station 1 and the respective wireless base stations 4-1 to 4-$n$ are used as radiuses, circles are drawn around coordinate values of the respective wireless base stations as centers. These coordinate values are obtained from the base station information database 112. Thus, the position of the portable terminal 1 may be predicted based upon cross points of these circles.

It should also be noted that in the above-explained example, the base station information is acquired from the base station information database 112 built in the mobile terminal 1. Alternatively, while this base station information database 112 is installed on the network 3, the base station information as to the peripheral wireless base stations may be acquired via the network 3. Also, the above-described base station information database 112 may be installed in the service provider's server 2. Further, while the wireless base station 4-1 broadcasts the base station information of the peripheral wireless base stations "4-2" through "4-$n$" by employing a specific channel, this wireless base station 4-1 may notify this base station information to the mobile terminal 1.

Also, in such a case that all of the wireless base stations 4-1 to 4-$n$ transmit the signals in synchronism with each other, the position of the mobile terminal 1 may be detected by employing a method operable in such a way that a distance difference between each of the wireless base stations and the mobile terminal 1 based upon differences contained in propagation delay of signals transmitted from the respective wireless base stations. In this alternative case, the position of the mobile terminal 1 may be detected based upon a cross point of a hyperbola which indicates a locus of a coordinate where a distance difference between two wireless base stations becomes constant.

It should also be noted that when the positioning unit 11 is constituted by employing semiconductor components, both the propagation delay measurement unit 110 and the terminal position calculation unit 111 may be arranged by using the same components, or the components different from each other.

Figures 5, 7:
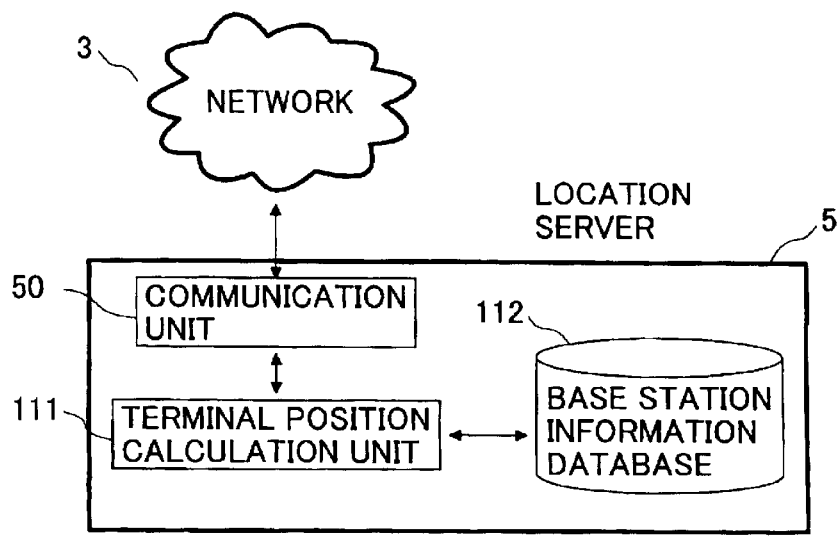
FIG. 5 illustratively shows a content of a table which describes a correspondence relationship between positioning accuracy and the position detecting method of the present invention.
FIG. 7 illustratively represents an arrangement of a position calculating server according to an embodiment of the present invention.

FIG. 5 indicates an example of a table which describes thereinto a correspondence relationship between positioning accuracy and the position detecting methods. The positioning unit 11 changes a total number 141 of wireless base stations for receiving signals, a monitoring time duration 142 of a signal, a total sampling number 143 used for averaging operation, and criteria 144 for judging a completion of a position calculation in response to the positioning accuracy 14. In this table, the total number 141 of the wireless base stations for receiving the signals implies a total number of wireless base stations for transmitting signals, the propagation delay of which are acquired by the propagation delay measurement unit 110 of the mobile terminal 1, and the signal monitoring time duration 142 implies lengths of time used to receive these signals. Also, the total sampling number 143 used for the averaging operation corresponds to a total number of predicted locations in such a case that a plurality of predicted positions are calculated from a plurality of received signals, and these plural predicted positions are averaged.

In the case that the larger the total number 141 of the wireless base stations for receiving the signals is increased, the longer the signal monitoring time duration 142 is increased, and the larger the total sampling number 143 for the averaging operation is increased, such information used to detect the position of the mobile terminal 1 is increased. As a result, the positioning accuracy 14 may be increased. Also, since the positioning unit 11 performs the calculation operation until the criteria 144 for judging the completion of the position calculation can be satisfied, the higher this position calculation completion criteria 144 become, the higher the positioning accuracy 14 is increased. As this position calculation completion criteria 144, for instance, there is a summation of such errors between distances up to the respective wireless base stations with respect to a predictable position of the mobile terminal 1, and signal propagation distances which are calculated based upon the propagation delay of the signals transmitted from the respective wireless base stations. If a summation of the distance errors up to the respective wireless base stations is high than, or equal to the judgment criteria, changing of the predicted position of the mobile terminal 1 is repeatedly carried out so as to search such a position where a summation of distance errors may be furthermore decreased.

Conversely, in the case that the total number 141 of the wireless base stations, the signal monitoring time duration 142, and the total sampling number 143 used for the averaging operation are decreased, or the position calculation completion criteria 144 are made low, the position detection time duration may be shortened, instead of the positioning accuracy. As a result, the load given to the mobile terminal 1 can be decreased and the power consumption thereof when the position of this mobile terminal 1 is detected can be suppressed.

Furthermore, the below-mentioned position detecting method such as a weather forecast may also be covered by the technical scope/spirit of the present invention. That is, in accordance with this position detecting method, even in such a case that positioning errors of several Km are contained in a positioning operation result, when there is no specific difference in contents of provided information, a position of a base station to which a portable terminal is connected is set as a position (location) of this portable terminal. As a result of this position detecting method, the positioning operation executed in the portable terminal may be omitted, and the load given to the portable terminal and the power consumption thereof can be reduced.

Alternately, this table may be installed in the mobile terminal 1. Also, while this table may be installed in the service provider's server 2, only a portion of the total number 141 of the wireless base stations for receiving the signals, a portion of the signal monitoring time 142, a portion of the total sampling number 143 used for the averaging operation, and a portion of the position calculation completion criteria 144 may be notified from this service provider's server 2 to the mobile terminal 1 as such information indicative of required accuracy.

Figure 6:
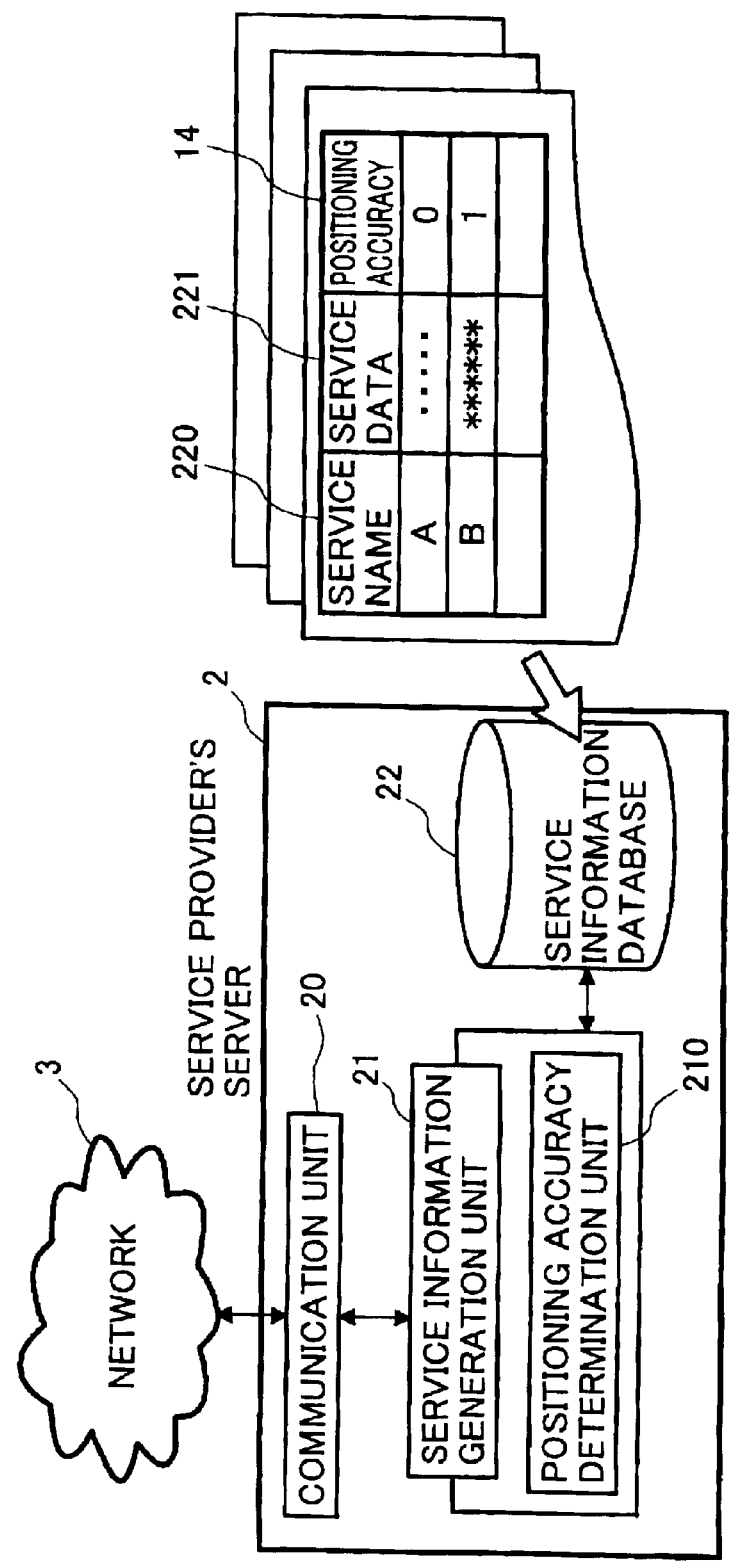
FIG. 6 illustratively shows an arrangement of a service provider's server according to an embodiment of the present invention.

FIG. 6 schematically indicates one example of an arrangement of a service provider's server according to one embodiment of the present invention. The service provider's server 2 is constructed of a communication unit 20, a service information generation unit 21, and a service information database 22.

Upon receipt of the service-receiving request 60 sent from the mobile terminal 1, the service provider's server 2 acquires the positioning accuracy 14 from the service information database 22, while this positioning accuracy 14 is required so as to provide such a service 220 which is designated within a service request message. Next, this service provider's server 2 notifies to the mobile terminal 1, the positioning request 61 in conjunction with an instruction of setting this positioning accuracy 14. In response to this notification, since the positional information 62 which is measured in accordance with the designated positioning accuracy 14 is transmitted, the service provider's server 2 receives this positional information 61 via the communication unit 20. Based upon this received positional information 62, the service provider's server 2 acquires service data 221 required to provide a service from the service information database 22 so as to generate service information 63, and then, transmits this generated service information 63 to the mobile terminal 1.

Next, a description will now be made of such an actual service providing operation of both operations of a mobile terminal and operations of a service provider's server in the case that peripheral area information in correspondence with a position of the mobile terminal is provided.

First, an owner of the mobile terminal designates an item of a bus stop, a movie theater, or the like by manipulating a button provided on the mobile terminal so as to request to acquire peripheral area information. Then, the mobile terminal transmits this peripheral area information acquiring request to a service provider's server employed by an application service provider which may provide the peripheral area information. The service provider's server sets positioning accuracy in correspondence with the content of the requested peripheral area information. For instance, in the case that the requested item corresponds to the peripheral area information related to the bus stop, it is so assumed that the service provider's server may provide such information related to bus stops which are located within a range of 500 meters around the own mobile terminal. In the case that the information as to such a narrow area of the 500-meter range is provided, for instance, when a detection error of 100 meters happens to occur, the content of the information which is provided to the owner of the mobile terminal is changed. As explained above, in order not provide such erroneous information caused by the detection error, the service provider's server instructs the mobile terminal to detect the position in high accuracy. On the other hand, in the case that the requested item corresponds to the peripheral area information related to the movie theater, it is so assumed that the service provider's server may provide such information as to movie theaters which are located within a circle having a radius of 10 Km, while the mobile terminal is located as a center of this circle. In this case, since the area used to retrieve the information is wide, even when such a detection error of, for example, 100 meters happens to occur, there is a small adverse influence given to the information which is provided to the owner of the mobile terminal. As a consequence, while such a position detection operation that a load given to the mobile terminal is light is carried out by suppressing the positioning accuracy, the power consumption of this mobile terminal may be reduced. It should be understood that the information as to these service contents and the positioning accuracy corresponding to these service contents is stored in the service information database employed in the service provider's server.

Also, similar to a man navigation system, in the case that this man navigation system is directed to a display of positional information of a mobile terminal and also to a display of a travel path, a position detecting method is changed in response to a condition of the mobile terminal, so that utility of a user who uses positional information of the mobile terminal can be improved. For instance, in such a case that a mobile terminal is traveled in a high speed, since a position detection time duration per one time is shortened, a tracking characteristic with respect to this traveling operation may be improved, so that a present position of the mobile terminal may be displayed in real time. In this case, in such a case that an owner of the mobile terminal takes an automobile, or a train to be traveled in a high speed, the owner sets the position detecting method to a high-speed travel mode by manipulating buttons provided on this mobile terminal. In this high-speed travel mode, the mobile terminal employs such a terminal position detecting method that although the positioning accuracy is low, the position detection time duration per one time is shortened. Then, this mobile terminal repeatedly performs the position detecting operation in a short time period. As a result, since such a positional information corresponding to the travel of this mobile terminal in real time may be acquired, both a proper navigation service and a terminal position tracking service may be provided. Alternatively, while a speed detector such as a gyroscope is connected to a mobile terminal so as to automatically detect a travel speed of this mobile terminal, an application program installed in this mobile terminal may change a position detecting method in response to this detected travel speed.

Such a method that positioning accuracy is changed in response to a reduced scale of a map which indicates a positioning result corresponds to one of the embodiments according to the present invention. As a concrete example of changing positioning accuracy in accordance with a reduced scale of a map, such a navigation system with employment of a portable terminal is conceivable. In the case that a road trail up to a destination place is confirmed by using a map, at a place located far from this destination place, such a map reduced in a small scale is required by which a user of the portable terminal can recognize a positional relationship defined from a present position up to the destination place. Conversely, at a place located close to the destination place, such a map reduced in a large scale is made effective. In this map, a relationship among peripheral buildings, geographic features, and the destination place is described in detail. As a consequence, in such a navigation system with employment of a portable terminal, since a reduced scale of a map to be displayed is automatically changed in response to a distance up to the destination place, utility of a user of this portable terminal can be improved. At this time, since the position measuring system of the present invention is employed, the positioning accuracy can be changed in response to a reduced scale of a map to be displayed. Concretely speaking, in such a case that a map reduced in a large scale is employed, the positioning operation is carried out in low positioning accuracy. In this case that a map reduced in a small scale is employed, the positioning operation is carried out in high positioning accuracy. As a result, while no such a large difference is indicated on the positioning results displayed in the map, the load given to the portable terminal can be reduced and also the power consumption thereof can be decreased.

In the above-described embodiment, the position detecting function is provided with the mobile terminal 1. Alternatively, in order to simplify the structure of the mobile terminal 1, while such a location server containing both the terminal position calculation unit 111 and the base station information database 112, which are provided in the positioning unit 11, may be provided on the network 3, the location calculation of the mobile terminal may be carried out by this location server.

FIG. 7 schematically shows an example of a structure of a location server 5. This location server 5 is constituted by a communication unit 50, a terminal position calculation unit 111, and a base station information database 112, while both the terminal position calculation unit 111 and the base station information database 112 are operable in a similar manner to the operations of these corresponding structural elements employed in the positioning unit 11 of the mobile terminal 1.

FIG. 8 schematically indicates a process flow operation of messages until a service is provided in the case that the location server 5 is used. A mobile terminal which does not contain the terminal position calculation unit 111 within the positioning unit 11 may measure propagation delay of signals transmitted from the respective wireless base stations 4 by employing the propagation delay measurement unit 110. Then, this mobile terminal 6 transmits a position-calculating request 64 made based on these measured propagation delay to the location server 5. The location server 5 calculates a location of the mobile terminal 6 in a similar manner to the above-described terminal position calculation manner based upon both coordinate values of the respective wireless base stations 4, which are acquired from the base station database 112 built in this location server 5, and also the propagation delay of the signals transmitted from the respective wireless base stations 4, which are acquired in response to the position calculation request 64. Then, the calculated position calculation response 65 is sent to the mobile terminal 6, and this mobile terminal 6 generates the positional information 62 based upon this position calculation response 65 so as to send this positional information 62 to the service provider's server 2. At this time, alternatively, the location server 5 may directly transmit the positional information 62 to the service provider's server 2. Furthermore, the terminal position calculation function owned by the location server 5 may be provided within the service provider's server 2.

As previously explained, in such a case that the location calculating operation is carried out by the location server 5, while a table which describes a correspondence relationship between positioning accuracy and a position detecting method is provided in either the service provider's server or the mobile terminal, such an information related to the position detecting method may be notified to the location server 5. Also, a similar table may be provided in the location server. In this alternative case, positioning accuracy is notified to the location server, and then, this location server may determine such a position detecting method corresponding to this notified positioning accuracy.

Also, the above-described embodiment is directed to such a system capable of detecting the position of the mobile terminal by employing the signals transmitted from the wireless base stations 4. Alternatively, such a position detecting system as the GPS system may be used which detects a position of a mobile terminal by receiving signals transmitted from satellites. In this alternative case, the total number 141 of the wireless base stations for receiving the signals among the various sorts of parameters used to change the positioning accuracy corresponds to a total number of satellites for receiving GPS signals.

In accordance with other aspects of the present invention, the below-mentioned apparatus may be covered by the technical scope/spirit of the present invention.

In a location server apparatus comprised of: a reception unit for receiving information as to propagation delay time of signals which are transmitted from a plurality of signal generating sources and are received by a mobile terminal; a transmission unit; and a position calculation unit for calculating a position of the mobile terminal based upon information with respect to the received propagation delay time, this location server apparatus performs the location calculation in variable accuracy in response to information related to accuracy of the notified location calculation.

In a location server apparatus comprised of: a reception unit for receiving information as to propagation delay time of signals which are transmitted from a plurality of signal generating sources and are received by a mobile terminal; a transmission unit; and a position calculation unit for calculating a position of the mobile terminal based upon information with respect to the received propagation delay time, this location server apparatus performs the location calculation in variable accuracy in response to information related to accuracy of the notified location calculation;

the information related to the notified accuracy contains criteria of judging a completion of a position calculation; and the location calculation server apparatus judges as to whether or not the location calculation is continuously carried out based upon such a fact as to whether or not the criteria for judging the completion of the position calculation is satisfied.

In a location server apparatus comprised of: a reception unit for receiving information as to propagation delay time of signals which are transmitted from a plurality of signal generating sources and are received by a mobile terminal; a transmission unit; and a position calculation unit for calculating a position of the mobile terminal based upon information with respect to the received propagation delay time, this location server apparatus performs the location calculation in variable accuracy in response to information related to accuracy of the notified location calculation;

the location server apparatus contains a table which describes a correspondence relationship between accuracy and positioning methods; and the position calculation unit performs the position calculation in accordance with a positioning method corresponding to the information related to the notified accuracy.

In a semiconductor device mounted on a mobile terminal for performing a position detecting operation by employing signals which are received from a plurality of signal generating sources, the semiconductor device includes a propagation delay measurement unit for measuring a propagation delay amount of a received signal; and either a total number of the signal generating sources for generating the signals whose propagation delay is measured or a time length of receiving the signals is set in response to accuracy of a designated position detection.

In the above-described position detecting system for measuring the position of the mobile terminal, according to the embodiment of the present invention, the position detecting method can be changed in response to the required positioning accuracy by considering utility of the positional information. For example, in the case that the detection error may give only small adverse influences to the content of the service information such as a weather forecast, such a position detecting method capable of executing the positioning operation within the short time duration. Although the positioning accuracy becomes coarse, or low due to this position detecting method, this position detecting system can realize such a function capable of reducing the load give to the mobile terminal and also capable of suppressing the power consumption of this mobile terminal.

Also, since the time duration required to detect the position of the mobile terminal is changed within such a range that the quality of information to be provided is not varied, the waiting time of the information request person can be shortened.

Also, since the position detecting time duration is changed in response to the travel speed of the owner of the mobile terminal, the real time characteristic of the positional information of this mobile terminal can be improved.

It should be further understood by those skilled in the art that the foregoing description has been made on embodiments of the invention and that various changes and modifications may be made in the invention without departing from the spirit of the invention and the scope of the appended claims.

What is claimed is:

1. A mobile terminal apparatus comprising:

a transmission unit;

a reception unit for receiving signals which are transmitted from a plurality of signal generating sources; and a positioning unit for performing a position detecting operation by way of a positioning method based upon propagation delay time of said received signals, wherein:

said mobile terminal apparatus performs said position detecting operation for a requested service which uses a detected position;

accuracy of said position detecting operation by said positioning unit is variable;

said accuracy of said position detecting operation is set according to a predetermined correspondence between accuracy requirement and a kind of a requested service; and said positioning unit executes the position detecting operation by way of a positioning method in accordance with said set accuracy.

2. A mobile terminal apparatus as claimed in claim 1 wherein:

said transmission unit transmits a request for providing said position detecting operation to a service provider's server;

said positioning unit executes the position detecting operation in response to an instruction issued from said server, which is received by said reception unit;

said transmission unit transmits a result of said position detecting operation to said server; and said reception unit receives information related to said requested service from said server.

3. A mobile terminal apparatus as claimed in claim 1 wherein:

said positioning unit includes a propagation delay amount measurement unit for measuring propagation delay of said plurality of received signals;

information used to determine said positioning method contains a total number of the signal generating sources which are used to perform the position detecting operation; and said propagation delay measurement unit measures propagation delay of received signals, the total number of which is equal to a total number of said signal generating sources which are used to execute said position detecting operation.

4. A mobile terminal apparatus as claimed in claim 1 wherein:

said positioning unit includes a propagation delay measurement unit for measuring propagation delay of said plurality of received signals;

information used to determine said positioning method contains information related to a time duration used to measure the signals which are transmitted from said plurality of signal generating sources; and said propagation delay measurement unit measures propagation delay of the signals transmitted from said plurality of signal generating sources for a time period corresponding to said time duration.

5. A mobile terminal apparatus as claimed in claim 1 wherein:

said positioning unit includes a position calculation unit for executing a position calculating operation by employing propagation delay time of said received signals;

information used to determine said positioning method contains a total number of predicted positions;

said position calculation unit calculates the predicted positions, the total number of which is equal to said total number contained in the information used to determine the positioning method, by employing the signals transmitted form said plurality of signal generating sources; and said position calculation unit performs the position calculating operation by employing said plurality of predicted positions.

6. A mobile terminal apparatus as claimed in claim 1 wherein:

information used to determine said positioning method contains criteria for judging a completion of a position calculating operation; and said positioning unit judges as to whether or not said position detecting operation is continuously carried out by checking as to whether or not said position calculating completion criteria can be satisfied.

7. A mobile terminal apparatus as claimed in claim 1 wherein:

said mobile terminal apparatus displays the result of said position detecting operation on a map; and accuracy of said position detecting operation is set in response to a reduced scale of said map.

8. A mobile terminal apparatus as claimed in claim 1 wherein:

in the case that an instruction of the position detecting operation is inputted, said positioning unit judges as to whether or not the position detecting operation is again carried out in accordance with a past position detecting operation;

when the position detecting operation need to be again carried out, the positioning unit performs the position detecting operation; and when the position detecting operation need not to be again carried out, the positioning unit substitutes the result of said past position detecting operation for a result of a position detecting operation in response to said instruction of the position detecting operation.

9. A mobile terminal apparatus as claimed in claim 1 wherein:

said positioning method is set in accordance with a condition of said mobile terminal apparatus.

10. A mobile terminal apparatus as claimed in claim 1 wherein:

said mobile terminal apparatus includes a table which describes a correspondence relationship between the accuracy of said position detecting operations and the information used to determine said positioning methods, and determines a positioning method based upon notified accuracy of the position detecting operation.

11. A server apparatus for providing plural sorts of services by using information related to a position of a detected mobile terminal, wherein:

said server apparatus is comprised of a table which describes a correspondence relationship between said plural sorts of services and said accuracy of the position detecting operations;

in the case that a request of providing a service is received, said server apparatus retrieves accuracy of a position detecting operation corresponding to said requested services from said table;

said server apparatus transmits such an instruction for performing the position detecting operation in said retrieved accuracy to said mobile terminal;

said server apparatus receives the result of said position detecting operation; and said server apparatus generates service information related to said required service based upon the result of said position detecting operation and outputs said generated service information.

12. A server apparatus as claimed in claim 11 wherein:

the accuracy of the position detecting operation of said table is described as any one of a total number of signal generating sources used to perform the position detecting operation, a time duration used to measure the signals transmitted from said plurality of signal generating sources, a total number of predicted positions to be utilized, and position calculation completion criteria; and said predicted positions correspond to a plurality of positions which are calculated by employing the signals transmitted from said plurality of signal generating sources, and are utilized so as to perform the position detecting operation based upon said plurality of predicted positions.

13. A service providing method for providing plural sorts of services by utilizing information related to a position of a detected mobile terminal, comprising:

a step for receiving a request for providing a service and setting accuracy of detecting the position of said mobile terminal in response to said service request, according to a predetermined correspondence between accuracy and a sort of a requested service;

a step for transmitting such an instruction for performing the position detecting operation in said set accuracy to said mobile terminal;

a step for receiving the result of said position detecting operation; and a step for generating service information related to said required service based upon the result of said position detecting operation and for outputting said generated service information.

14. A mobile terminal apparatus as claimed in claim 1 wherein:

said positioning unit includes a position calculation unit for executing a position calculating operation by employing propagation delay time and said received signals;

information used to determine said positioning method contains a total number of predicted positions, each of said predicted positions being calculated from said plurality of received signals;

said position calculation unit calculates the predicted positions, the total number of which is equal to said total number contained in the information used to determine the positioning method, by employing the signals transmitted from said plurality of signal generating sources; and said position calculation unit performs the position calculating operation by employing said plurality of predicted positions, said plurality of predicted positions being averaged for performing the position calculating operation.

15. A server apparatus as claimed in claim 11 wherein:

the accuracy of the position detecting operation of said table is described as any one of a total number of signal generating sources used to perform the position detecting operation, a time duration used to measure the signals transmitted from said plurality of signal generating sources, a total number of predicted positions to be utilized, and position calculation completion criteria; and said predicted positions correspond to a plurality of positions which are calculated by employing the signals transmitted from said plurality of signal generating sources, and are averaged and utilized so as to perform the position detecting operation based upon said plurality of predicted positions.

16. A mobile terminal apparatus comprising:

a transmission unit for transmitting a first signal, to a server, including a request for a service to be provided from the server;

a reception unit for receiving a second signal from the server including an instruction to detect a position of the mobile terminal apparatus with an accuracy which is to be determined according to the requested service, a plurality of sets of relationship between a service and an accuracy corresponding thereto having been recorded within the server in advance;

a positioning unit for detecting the position of the mobile terminal apparatus in response to the second signal, the detecting operation being performed by way of both reception of a plurality of measurement signals, at the reception unit, sent from the corresponding signal sources and a calculation of the position of the mobile terminal apparatus based upon propagation delay time among the received measurement signals;

wherein the mobile terminal apparatus transmits a third signal, to the server, including an information on the position thereof calculated by the positioning unit, and receives a fourth signal, from the server, including another information on the requested service with the corresponding accuracy, the information on the service including the position of the mobile terminal apparatus calculated by the positioning unit.

17. A mobile terminal apparatus as claimed in claim 16 wherein:

the positioning unit includes a propagation delay amount measurement unit for measuring propagation delay of the plurality of measurement signals received;

information used to determine the position of the mobile terminal apparatus contains a total. number of the signal sources which are user to determine the position, of the mobile terminal apparatus; and the propagation delay measurement unit measures propagation delay of the measurement signals received, the total number of which is equal to a total number of the signal sources which are used to determine the position.

18. A mobile terminal apparatus as claimed in claim 16 wherein:

the positioning unit includes a propagation delay measurement unit for measuring propagation delay of the plurality of measurement signals received;

information used to determine the positioning of the mobile terminal apparatus contains information related to a time duration used to measure the signals which are transmitted from the plurality of signal sources; and the propagation delay measurement unit measures propagation delay of the signal transmitted from the plurality of signal sources for a time period corresponding to the time duration.

19. A mobile terminal apparatus as claimed in claim 16 wherein:

the positioning unit includes a position calculation unit for executing a position calculating operation by employing propagation delay time of the measurement signals received;

information used to determine the position of the mobile terminal apparatus contains a total number of predicted positions, each of the predicted positions being calculated from the plurality of received signals;

said position calculation unit calculates the predicted positions, the total number of which is equal to the total number contained in the information used to determine the position of the mobile terminal apparatus, by employing the signals transmitted from the plurality of signal sources; and the position calculation unit performs the position calculating operation by employing the plurality of predicted positions, the plurality of predicted positions being averaged for performing the position calculating operation.

20. A mobile terminal apparatus as claimed in claim 19 wherein:

information used to determine the position of the mobile terminal apparatus contains criteria for judging a completion of the position calculating operation; and the positioning unit judges as to whether or not the position calculating operation is to be continuously carried out by checking as to whether or not the position calculating completion criteria can be satisfied.

21. A mobile terminal apparatus as claimed in claim 16 wherein:
the mobile terminal apparatus displays a result of the position detecting operation on a map; and
accuracy of the position detecting operation is set in response to a reduced scale of the map.

22. A mobile terminal apparatus as claimed in claim 16 wherein:
in the case that an instruction of the position detecting operation is inputted, the position detecting unit judges as to whether or not the position detecting operation is again to be carried our in accordance with a past position detecting operation;
when the position detecting operation needs to be again carried out, the positioning unit performs the position detecting operation; and
when the position detecting operation needs not to be again carried out, the positioning unit substitutes the result of the past position detecting operation for a result of the position detecting operation in response to the instruction of the position detecting operation.

23. A mobile terminal apparatus as claimed in claim 16 wherein:
the position detecting operation is set in accordance with a condition of the mobile terminal apparatus.

24. A mobile terminal apparatus as claimed in claim 16 wherein:
the mobile terminal apparatus includes a table which describes a correspondence relationship between the accuracy of the position detecting operations and the information used to determine the position of the mobile terminal apparatus in accordance with the accuracy sent from the server.

25. A server apparatus for providing a mobile terminal apparatus with a service with an accuracy regarding a position of the mobile terminal apparatus, comprising:
receiving unit for receiving a first signal, from the mobile terminal apparatus, including a request for a service to be provided to the mobile terminal apparatus, the server apparatus including a table which describes a correspondence relationship between a plurality of services and a set of accuracy respectively corresponding to each of services;
transmitting unit for transmitting a second signal in response to the first signal, to the mobile terminal apparatus, including an instruction to detect a position of the mobile terminal apparatus with an accuracy corresponding to the requested service,
wherein the receiving unit receives a third signal, from the mobile terminal apparatus, including an information on the position of the mobile terminal apparatus determined by the mobile terminal apparatus, and the transmitting unit transmits a fourth signal, to the mobile terminal apparatus, including another information on the requested service with the corresponding accuracy, the information on the service including the position of the terminal apparatus.

26. A server apparatus as claimed in claim 25 wherein:
the accuracy of the position detecting operation of the table is described as any one of a total number of signal sources used to perform the position detecting operation, a time duration used to measure the signals transmitted from the plurality of signal sources, a total number of predicted positions to be utilized, and position calculation completion criteria; and
the predicted positions correspond to a plurality of positions which are calculated by employing the signals transmitted from the plurality of signal. sources, and are averaged and utilized so as to perform the position detecting operation based upon the plurality of predicted positions.

27. A service providing method for providing plural sorts of services from a server to a mobile terminal by utilizing information on a position of the terminal, comprising:
a step, at the server, for receiving a request from the terminal for providing a service at the server and designating accuracy of a position detection of the terminal according to the requested service, the accuracy being determined based on the requested service;
a step for transmitting an instruction from the server to the terminal for detecting a position of the terminal with the accuracy designated;
a step, at the server, for receiving the result of the detection from the terminal; and
a step for generating service information on the requested service based upon the result of the position detection, and for outputting said generated service information to the terminal, the generated and output information including the position of the terminal detected.

* * * * *

UNITED STATES PATENT AND TRADEMARK OFFICE
CERTIFICATE OF CORRECTION

PATENT NO. : 6,750,812 B2
DATED : June 15, 2004
INVENTOR(S) : Mizugaki et al.

It is certified that error appears in the above-identified patent and that said Letters Patent is hereby corrected as shown below:

<u>Title page,</u>
Item [56], References Cited, FOREIGN PATENT DOCUMENTS,
-- 07-181242   12/22/1993   Japan --

Signed and Sealed this

Twenty-sixth Day of April, 2005

JON W. DUDAS
*Director of the United States Patent and Trademark Office*